(12) United States Patent
Otani

(10) Patent No.: US 11,474,643 B2
(45) Date of Patent: Oct. 18, 2022

(54) POSITION DETECTION METHOD, AND POSITION DETECTION DEVICE

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/349,123

(22) Filed: Jun. 16, 2021

(65) Prior Publication Data

US 2021/0397295 A1      Dec. 23, 2021

(30) Foreign Application Priority Data

Jun. 17, 2020   (JP) .............................. JP2020-104734

(51) Int. Cl.
    *G06F 3/042*   (2006.01)
    *G06F 3/041*   (2006.01)
    *G03B 17/54*   (2021.01)

(52) U.S. Cl.
    CPC .......... *G06F 3/0421* (2013.01); *G03B 17/54* (2013.01); *G06F 3/0416* (2013.01)

(58) Field of Classification Search
    None
    See application file for complete search history.

(56) References Cited

U.S. PATENT DOCUMENTS

| 2004/0108990 | A1  | 6/2004  | Lieberman et al. |
| 2011/0254810 | A1  | 10/2011 | Lee et al. |
| 2013/0343601 | A1* | 12/2013 | Jia ........................ G06V 10/143 |
|              |     |         | 382/103 |
| 2015/0254819 | A1* | 9/2015  | Hara ...................... G06T 7/521 |
|              |     |         | 345/647 |

FOREIGN PATENT DOCUMENTS

| JP | 2004-523031 A | 7/2004 |
| JP | 2006-098789 A | 4/2006 |
| JP | 2007-41244 A  | 2/2007 |
| JP | 2008-242099 A | 10/2008 |
| JP | 2016-166810 A | 9/2016 |

OTHER PUBLICATIONS

"XperiaTM Touch: Smart Projector Adopting Touch Operation". Sony Corporation, Sony Marketing Inc., May 2, 2017, URL: <https://www.sony.jp/feature/products/170502/>.

* cited by examiner

*Primary Examiner* — Stephen T. Reed
(74) *Attorney, Agent, or Firm* — Oliff PLC

(57) ABSTRACT

The position detection method includes projecting a detecting image on a projection surface from a projection section, taking, by an imaging section, an image of the projection surface in a first direction from the projection section in a situation in which the detecting image is projected on the projection surface and a pointing body touches the projection surface to thereby generate imaging data, and detecting a position of a touch portion by the pointing body on the projection surface based on the imaging data, wherein the detecting image represents a plurality of objects located in a matrix and the position of the touch portion is detected based on a positional relationship in the predetermined direction corresponding to a first direction of the plurality of objects represented by the imaging data.

6 Claims, 7 Drawing Sheets

POSITION DETECTION METHOD, AND POSITION DETECTION DEVICE

The present application is based on, and claims priority from JP Application Serial Number 2020-104734, filed Jun. 17, 2020, the disclosure of which is hereby incorporated by reference herein in its entirety.

BACKGROUND

1. Technical Field

The present disclosure relates to a position detection method, a method of controlling a projector, a position detection device, and a projector.

2. Related Art

JP-A-2006-98789 (Document 1) discloses a detection device for detecting a position of a portion to be touched by a finger of a user out of a projection surface, namely a touch position. The detection device first projects light in a planar manner so as to extend along the projection surface. The detection device takes an image of the projection surface to thereby generate imaging data. When the finger of the user touches the projection surface, the imaging data represents the light reflected by the finger of the user out of the light projected in the planar manner. The detection device detects the touch position based on the imaging data.

When a distance between the light projected in the planar manner and the projection surface is long, a phenomenon that a part of the light is reflected by a finger of the user which does not touch the projection surface becomes apt to occur. When this phenomenon occurs, the detection device described in Document 1 erroneously detects the touch position despite the fact that a pointing body as a finger of the user or the like does not touch the projection surface.

SUMMARY

A position detection method according to an aspect of the present disclosure includes the steps of projecting a detecting image on a projection surface from a projection lens, taking an image of the projection surface via an imaging lens located at a place distant in a first direction from the projection lens to thereby generate imaging data in a situation in which a pointing body touches the projection surface in a situation in which the detecting image is projected on the projection surface, and detecting a position of a touch portion touched by the pointing body on the projection surface based on the imaging data, wherein the detecting image represents a plurality of objects located in a matrix, a first distance between two objects adjacent to each other in a predetermined direction corresponding to the first direction out of the plurality of objects is longer than both of a second distance and a third distance, the second distance is a distance between two objects adjacent to each other in a row direction of the matrix out of the plurality of objects, the third distance is a distance between two objects adjacent to each other in a column direction of the matrix out of the plurality of objects, and the position of the touch portion is detected based on a positional relationship in the predetermined direction of the plurality of objects represented by the imaging data.

A position detection device according to another aspect of the present disclosure includes a projection lens configured to project a detecting image on a projection surface, an imaging lens which is located at a place distant in a first direction from the projection lens, an image sensor which is configured to take an image of the projection surface via the imaging lens to thereby generate imaging data in a situation in which a pointing body touches the projection surface in a situation in which the detecting image is projected on the projection surface, and one or more processors programmed to detect a position of a touch portion touched by the pointing body on the projection surface based on the imaging data, wherein the detecting image represents a plurality of objects located in a matrix, a first distance between two objects adjacent to each other in a predetermined direction corresponding to the first direction out of the plurality of objects is longer than both of a second distance and a third distance, the second distance is a distance between two objects adjacent to each other in a row direction of the matrix out of the plurality of objects, the third distance is a distance between two objects adjacent to each other in a column direction of the matrix out of the plurality of objects, and the one or more processors detect the position of the touch portion based on a positional relationship in the predetermined direction of the plurality of objects represented by the imaging data.

A position detection method including the steps of projecting a detecting image including a pattern in which objects are arranged periodically in a second direction from a projection lens, taking an image of an area including a projection surface on which the detecting image is projected via an imaging lens to thereby generate imaging data, and detecting a position of a touch portion in the first direction of the projection surface based on a positional relationship in the second direction of the objects in the imaging data, wherein the imaging lens disposed at a distance in the first direction from the projection lens.

DESCRIPTION OF AN EXEMPLARY EMBODIMENT

A. First Embodiment

A1. Outline of Projector 1000

Figure 1:
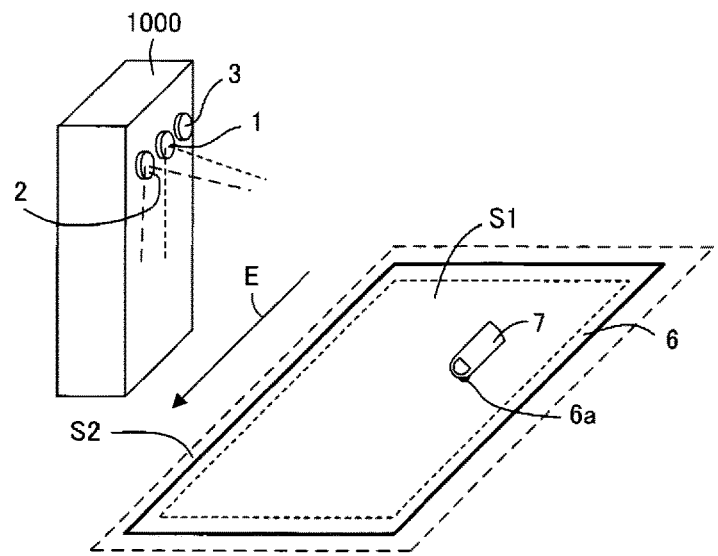
FIG. 1 is a diagram showing a projector according to a first embodiment.

FIG. 1 is a diagram showing a projector 1000 according to a first embodiment.

The projector 1000 includes a first projection device 1, a second projection device 2, and an imaging device 3.

The projector 1000 projects a visible light image S1 from the first projection device 1 toward the projection surface 6. The visible light image S1 is shown with visible light. The visible light image S1 represents at least any one of, for example, a character, a number, a graph, a table, a diagram, a drawing, a picture, and a moving image. The diagram and the drawing each include an icon.

The projector 1000 projects the detecting image S2 from the second projection device 2 toward the projection surface 6. The detecting image S2 is shown with infrared light. The detecting image S2 is not visually recognized by the user.

The projection surface 6 is, for example, an upper surface of a table. The projection surface 6 is not limited to the upper surface of the table. For example, the projection surface 6 can be a screen, a whiteboard, a wall, or a door.

The projector 1000 takes an image of an area including the projection surface 6 with the imaging device 3. In the projector 1000, the imaging device 3 is disposed at a distance from the second projection device 2 in a first direction E. For example, a projection opening of the second projection device 2 is disposed at a predetermined distance from an imaging opening of the imaging device 3 in the first direction E. FIG. 1 shows each of a position of the projection opening of the second projection device 2 and a position of the imaging opening of the imaging device 3 in the projector 1000.

The projector 1000 uses the second projection device 2 and the imaging device 3 to thereby detect a position of a touch portion 6a touched by the pointing body 7 in the projection surface 6.

The pointing body 7 is a finger of the user. The pointing body 7 is not limited to the finger of the user. The pointing body 7 can be, for example, a pointing rod or a pen.

The projector 1000 makes the imaging device 3 take the image of the projection surface 6 in a situation in which the detecting image S2 is projected on the projection surface 6. The imaging device 3 receives infrared light to thereby perform imaging. The imaging device 3 performs imaging to thereby generate the imaging data. The projector 1000 detects the position of the touch portion 6a, namely the touch position, based on the imaging data.

The projector 1000 executes processing associated with the touch position in accordance with the detection of the touch position. For example, the projector 100 executes the processing represented by an icon displayed with the visible light image S1 in accordance with the detection of the touch to the icon. The icon is disposed so as to correspond to an object described later, and includes an image representing a pointing content of the pointing body 7.

Further, the projector 1000 changes the visible light image S1 based on the touch position. For example, the projector 1000 changes the visible light image S1 into a visible light image representing a trajectory of the touch position. The change of the visible light image S1 is not limited to the change to the visible light image representing the trajectory of the touch position.

A2. One Example of Projector 1000

Figure 2:
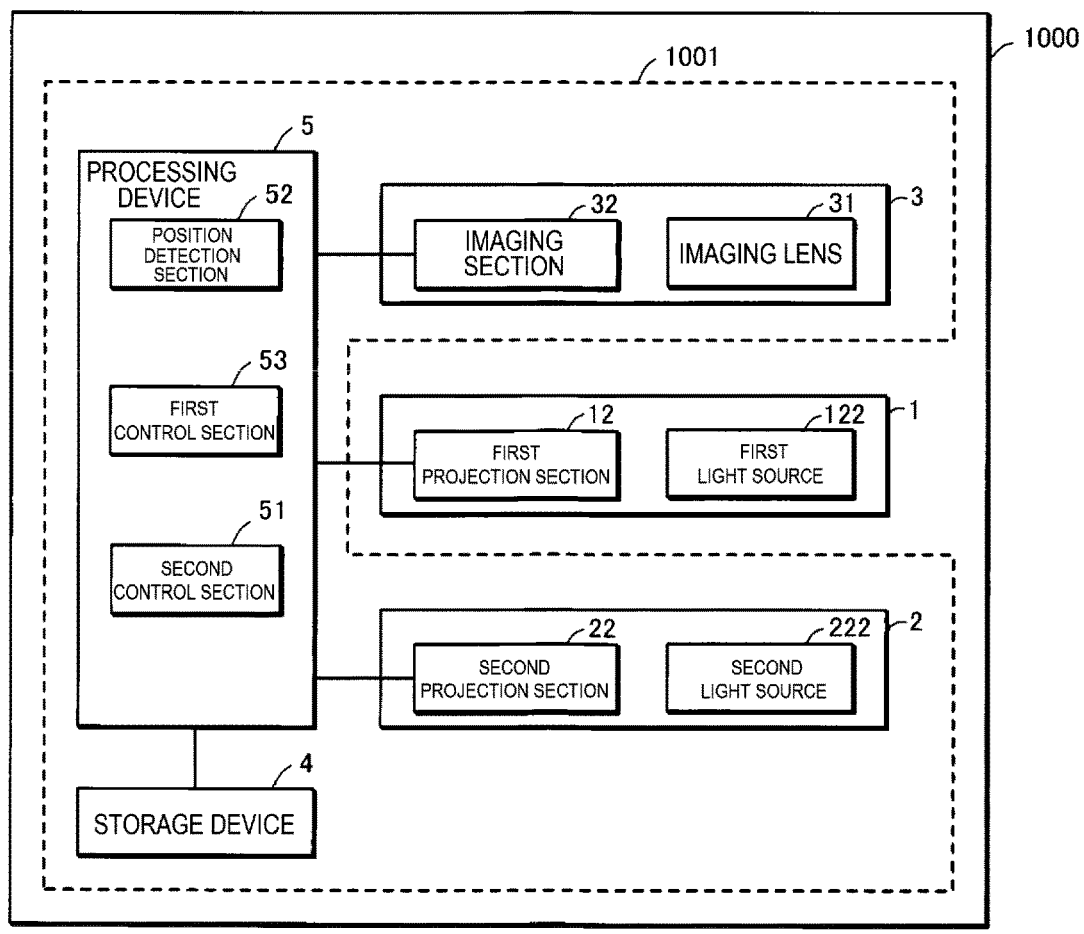
FIG. 2 is a diagram showing an example of the projector.

FIG. 2 is a diagram showing an example of the projector 1000. The projector 1000 includes the first projection device 1 described above, and a position detection device 1001.

The first projection device 1 includes a first light source 122 and a first projection section 12.

The first projection section 12 receives a first drive signal representing the visible light image S1 from a processing device 5 described later. The first projection section 12 projects the visible light image S1 on the projection surface 6 based on the first drive signal.

The position detection device 1001 detects the touch position. The position detection device 1001 includes the second projection device 2 described above, the imaging device 3 described above, a storage device 4 and the processing device 5.

The second projection device 2 includes a second light source 222 and a second projection section 22.

The second projection section 22 is an example of a projection section. The second projection section 22 receives a second drive signal representing the detecting image S2 from the processing device 5. The second projection section 22 projects the detecting image S2 on the projection surface 6 based on the second drive signal.

The imaging device 3 includes an imaging lens 31 and an imaging section 32.

Figure 5:
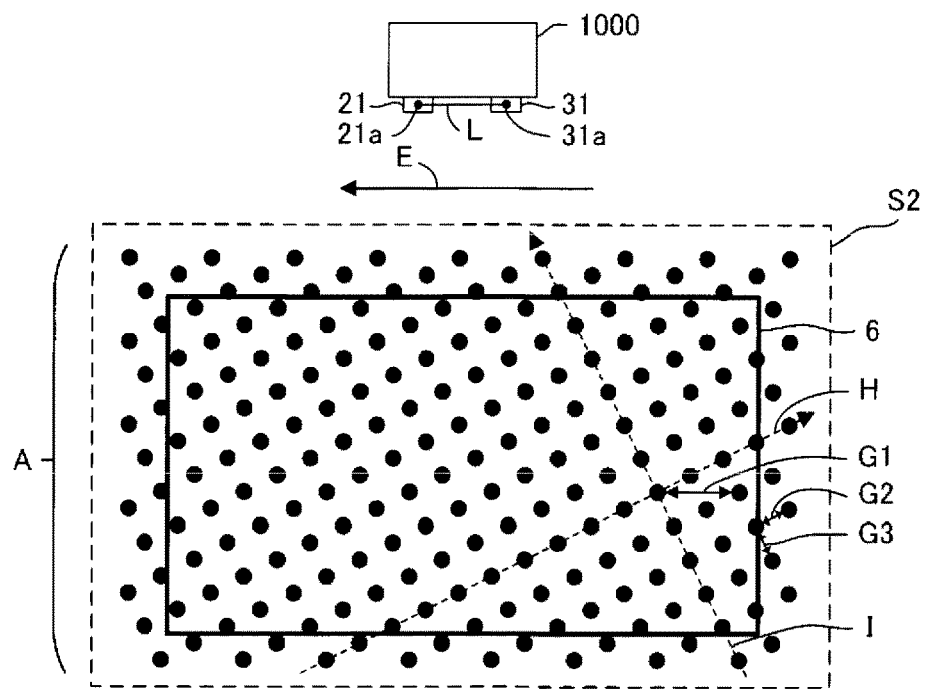
FIG. 5 is a diagram showing an example of a detecting image.

The imaging lens 31 is an optical system including a single lens or two or more lenses. As shown in FIG. 5 described later, the imaging lens 31 is located at a place distant in the first direction E from the second projection lens 21. The first direction E is a direction along a baseline L described later.

The imaging section 32 includes an image sensor for converting light collected by the imaging lens 31 into an electric signal. The image sensor is, for example, a CCD (Charge Coupled Device) image sensor, or a CMOS (Complementary Metal Oxide Semiconductor) image sensor.

The imaging section 32 takes an image of the projection surface 6 via the imaging lens 31 to thereby generate the imaging data. For example, the imaging section 32 takes an image of the projection surface 6 via the imaging lens 31 to thereby generate the imaging data in a touch situation in which the pointing body 7 touches the projection surface 6. In the touch situation, the detecting image S2 is projected on the pointing body 7 and the projection surface 6.

The storage device 4 is a computer-readable recording medium. The storage device 4 includes, for example, a nonvolatile memory and a volatile memory.

The storage device 4 stores a program for defining the operation of the projector 1000, and a variety of types of information. The variety of types of information includes, for example, first image information related to the visible light image S1 and second image information related to the detecting image S2. In this case, the visible light image S1 is an example of a first image, and the detecting image S2 is an example of a second image.

The processing device 5 is constituted by, for example, a single processor or two or more processors. Citing an example, the processing device 5 is constituted by a signal CPU (Central Processing Unit) or two or more CPUs. The single processor, the two or more processors, the single CPU, and the two or more CPUs are each an example of a computer. Further, a part or the whole of the function of the processing device 5 can be configured as a circuit not including a configuration of a CPU.

The processing device 5 retrieves the program from the storage device 4. The processing device 5 executes the program to thereby function as a first control section 53, a position detection section 52, and a second control section 51.

The first control section 53 controls the first projection device 1.

The first control section 53 retrieves the first image information related to the visible light image S1 from the storage device 4. It is possible for the first control section 53 to obtain the first image information from an information processing device such as a personal computer. When a portable recording medium on which the first image information is recorded is coupled to the projector 1000, it is possible for the first control section 53 to obtain the first image information from the portable recording medium.

The first control section 53 generates the first drive signal representing the visible light image S1 based on the first image information. The first control section 53 provides the first drive signal to the first projection section 12 to thereby make the first projection section 12 project the visible light image S1.

The first control section 53 changes the first drive signal based on the touch position. The change of the first drive signal causes a change of the visible light image S1.

The second control section 51 controls the second projection device 2 and the imaging device 3.

The second control section 51 retrieves the second image information related to the detecting image S2 from the storage device 4. When a portable recording medium on which the second image information is recorded is coupled to the projector 1000, it is possible for the second control section 51 to obtain the second image information from the portable recording medium. The portable recording medium is, for example, a USB (Universal Serial Bus) memory.

The second control section 51 generates the second drive signal representing the detecting image S2 based on the second image information. The second control section 51 provides the second drive signal to the second projection section 22 to thereby make the second projection section 22 project the detecting image S2.

The second control section 51 makes the imaging section 32 take the image of the projection surface 6. The imaging section 32 takes the image of the projection surface 6 to thereby generate the imaging data.

The position detection section 52 detects the touch position based on the imaging data.

A3. One Example of First Projection Device 1

Figure 3:
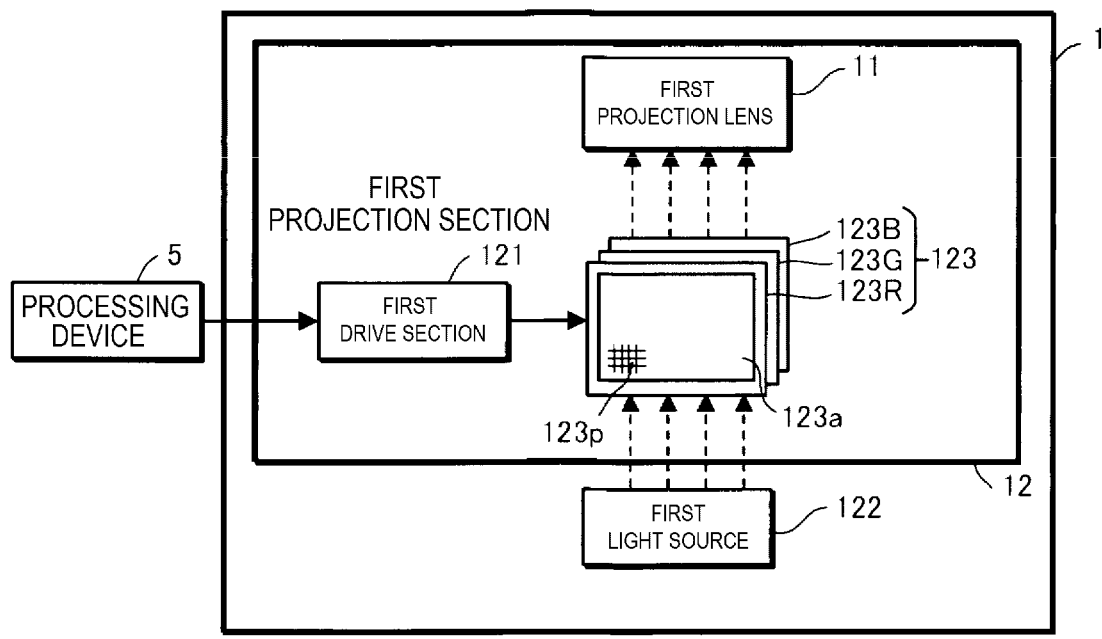
FIG. 3 is a diagram showing an example of a first projection section.

FIG. 3 is a diagram showing an example of the first projection device 1. The first projection section 12 includes a first projection lens 11, a first drive section 121, and a first liquid crystal light valve 123. When the first projection device 1 projects a color image, the first liquid crystal light valve 123 includes a red-color liquid crystal light valve 123R, a green-color liquid crystal light valve 123G, and a blue-color liquid crystal light valve 123B.

The first drive section 121 is formed of a circuit such as a driver. The first drive section 121 generates a first voltage signal based on the first drive signal provided from the processing device 5. The first drive section 121 applies the first voltage signal to the first liquid crystal light valve 123 to thereby drive the first liquid crystal light valve 123.

The light source 122 is, for example, an LED (light emitting diode). The first light source 122 is not limited to the LED, but can also be, for example, a xenon lamp, a super-high pressure mercury lamp, or a laser source. The first light source 122 emits visible light.

The light emitted from the first light source 122 enters an integrator optical system not shown. The integrator optical system reduces the unevenness in luminance distribution in the incident light.

The first liquid crystal light valve 123 has a rectangular pixel area 123a. The pixel area 123a includes a plurality of pixels 123p located in a matrix.

When the first drive section 121 applies the first voltage signal to each of the pixels 123p, the light transmittance of each of the pixels 123p is set to the light transmittance based on the first voltage signal. The light emitted from the first light source 122 is modulated by passing through the pixel area 123a, and thus, the visual light image S1 is formed. The visible light image S1 is projected via the first projection lens 11.

A4. One Example of Second Projection Device 2

Figure 4:
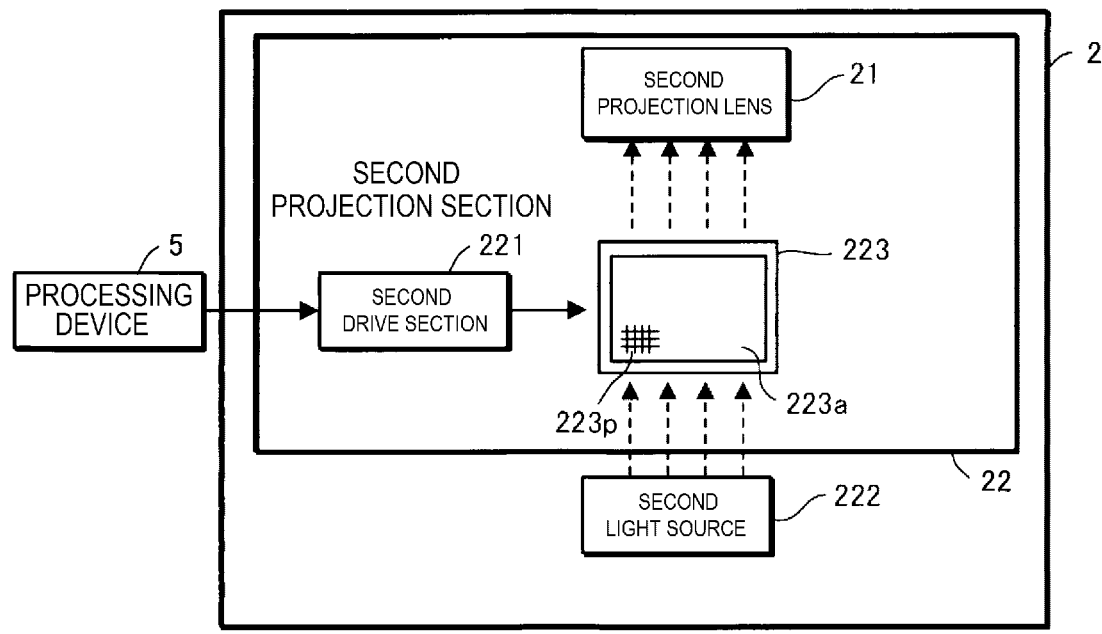
FIG. 4 is a diagram showing an example of a second projection section.

FIG. 4 is a diagram showing an example of the second projection device 2. The second projection section 22 includes a second projection lens 21, a second drive section 221, and a second liquid crystal light valve 223.

The second drive section 221 is formed of a circuit such as a driver. The second drive section 221 generates a second voltage signal based on the second drive signal provided from the processing device 5. The second drive section 221 applies the second voltage signal to the second liquid crystal light valve 223 to thereby drive the second liquid crystal light valve 223.

The second light source 222 emits infrared light. The second light source 222 is, for example, an infrared light emitting diode or an infrared laser source.

The light emitted from the second light source 222 enters an integrator optical system not shown. The integrator optical system reduces the unevenness in luminance distribution in the incident light. The light emitted from the second light source 222 passes through the integrator optical system, and then enters the second liquid crystal light valve 223.

The second liquid crystal light valve 223 includes a liquid crystal panel having a liquid crystal material existing between a pair of transparent substrates. The second liquid crystal light valve 223 has a rectangular pixel area 223a. The pixel area 223a includes a plurality of pixels 223p located in a matrix.

When the second drive section 221 applies the second voltage signal to each of the pixels 223p, the light transmittance of each of the pixels 223p is set to the light transmittance based on the second voltage signal. The light emitted from the second light source 222 passes through the pixel area 223a to thereby be modulated.

The second voltage signal to be applied to each of the pixels 223p is generated based on the second drive signal, and the second drive signal is generated based on the second image information. Therefore, the detecting image S2 of the infrared light based on the second image signal is formed. The detecting image S2 is projected via the second projection lens 21. The second liquid crystal light valve 223 is an example of a light modulation device.

The second projection device 2 can change the detecting image S2 using the light modulation device. For example, the detecting image S2 is a dot pattern as described later. It is possible for the second projection device 2 to easily project the detecting image S2 which is changed in dot size, dot pattern cycle, and so on so that the detection of the touch position does not become complicated in accordance with an arrangement relationship between the second projection device 2, the imaging device 3, and the projection surface 6, and the width and the thickness of the pointing body 7.

The second projection section 2 is not necessarily required to be provided with the second projection lens 21, the second drive section 221, and the second liquid crystal light valve 223. For example, it is possible for the second projection device 2 to be provided with a diffractive optical element having a surface shape corresponding to the pattern of the detecting image S2. By irradiating the diffractive optical element disposed in the projection opening with the infrared laser beam from the second light source 222, it is possible to project the detecting image S2 on the projection surface 6. By changing the surface shape of the diffractive optical element, it is possible to change the detecting image S2.

A5. One Example of Detecting Image S2

FIG. 5 is a diagram showing an example of the detecting image S2. FIG. 5 schematically shows the situation in which the detecting image S2 as the infrared light is projected on the projection surface 6 from the projector 1000 disposed in such a manner as shown in FIG. 1.

The detecting image S2 represents a plurality of dots A. The plurality of dots A is an example of a plurality of objects. The plurality of objects is not limited to the plurality of dots A. For example, the plurality of objects can be a plurality of polygons, or a plurality of ellipses.

The detecting image S2 represents a plurality of dots A located in a matrix. The plurality of dots A located in a matrix means the plurality of dots A arranged at a predetermined intervals in a row direction of the matrix and arranged at a predetermined interval in a column direction of the matrix.

A line connecting the center 21a of the second projection lens 21 and the center 31a of the imaging lens 31 is referred to as the baseline L. The length of the baseline L is referred to as "L1." The first direction E is a direction along the baseline L. The center 21a of the second projection lens 21 is a principal point of the second projection lens 21. The center 31a of the imaging lens 31 is a principal point of the imaging lens 31.

The row direction in the matrix of the plurality of dots A is referred to as a "row direction H." The column direction in the matrix of the plurality of dots A is referred to as a "column direction I." The row direction H is perpendicular to the column direction I. The row direction H crosses the first direction E. The column direction I crosses the first direction E.

The distance between two dots adjacent to each other in a predetermined direction corresponding to the first direction E out of the plurality of dots A on the projection surface 6 is referred to as a "first distance G1." The distance between two objects adjacent to each other in the row direction H out of the plurality of dots A is referred to as a "second distance G2." The distance between two objects adjacent to each other in the column direction I out of the plurality of dots A is referred to as a "third distance G3."

The first distance G1 is longer than both of the second distance G2 and the third distance G3. For example, the predetermined direction is a direction along the first direction E, and can be the same direction as the first direction E, or can also be shifted from the first direction E in an allowable range. The predetermined direction is an example of a second direction.

A6. Features of Detecting Image S2

Figure 6:
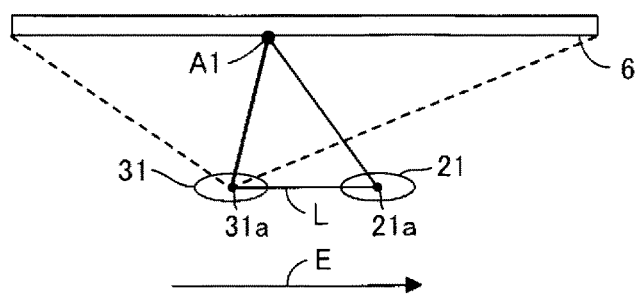
FIG. 6 is a diagram showing a state in which a dot is projected on a projection surface.
Figure 7:
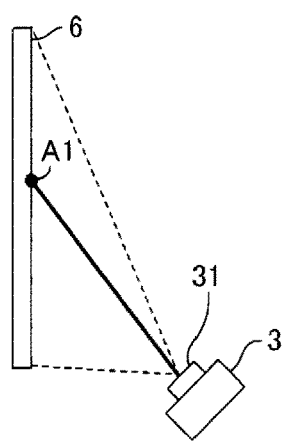
FIG. 7 is a diagram of a configuration shown in FIG. 6 viewed from a direction M perpendicular to the projection surface.
Figure 8:
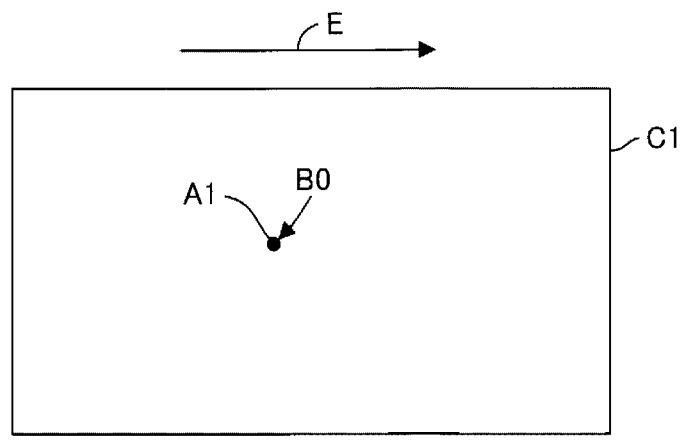
FIG. 8 is a diagram showing a first taken image represented by first imaging data.

FIG. 6 through FIG. 8 are diagrams for explaining the situation in which the pointing body 7 does not exist between the imaging lens 31 and the projection surface 6. There is shown a dot A1 as one of the plurality of dots A.

FIG. 6 is a diagram showing the state in which the dot A1 projected on the projection surface 6 from the second projection lens 21 is imaged by the imaging lens 31 distant as much as a distance L1 in the first direction E from the second projection lens 21. FIG. 7 is a diagram of the state shown in FIG. 6 viewed from the first direction E.

FIG. 8 is a diagram showing a first taken image C1 represented by first imaging data generated by the imaging device 3 in FIG. 6 and FIG. 7. The first imaging data is generated by the imaging device 3 for taking the image of the projection surface 6 in the situation in which the dot A1 is projected on the projection surface 6 in the situation in which the pointing body 7 does not exist between the imaging lens 31 and the projection surface 6. The first taken image C1 shows a position B0 of the dot A1 with which the projection surface 6 is irradiated.

Figure 9:
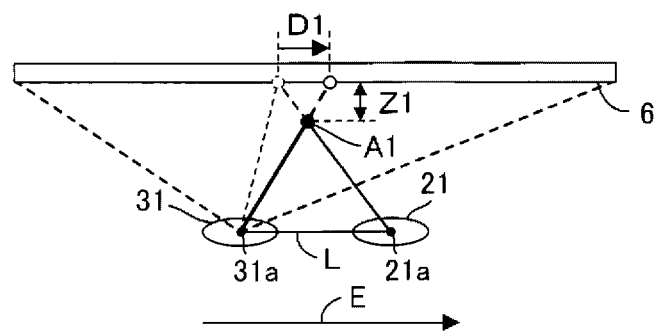
FIG. 9 is a diagram showing a state in which a pointing body touching the projection surface is irradiated with the dot.
Figure 10:
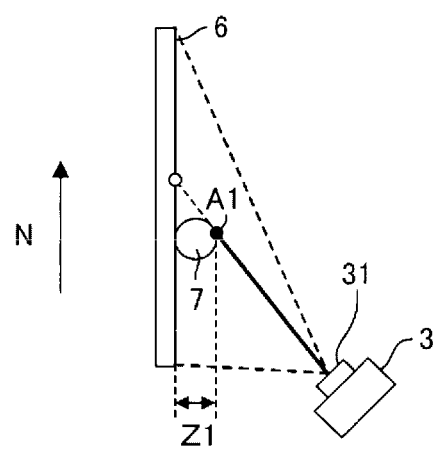
FIG. 10 is a diagram of the configuration shown in FIG. 9 viewed from the direction M.
Figure 11:
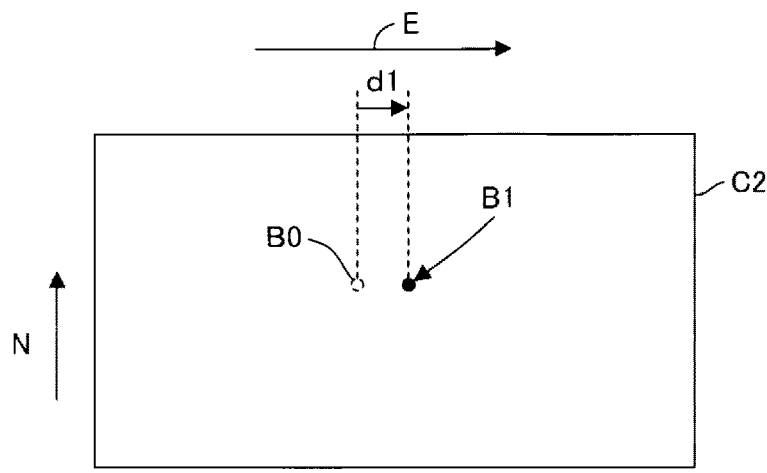
FIG. 11 is a diagram showing a second taken image represented by second imaging data.

FIG. 9 through FIG. 11 are diagrams for explaining the situation in which the pointing body 7 existing between the imaging lens 31 and the projection surface 6 touches the projection surface 6.

FIG. 9 is a diagram showing the state in which the dot A1 which is emitted from the second projection lens 21, and with which the pointing body 7 touching the projection surface 6 is irradiated is imaged by the imaging lens 31 distant as much as the distance L1 in the first direction E from the second projection lens 21. In FIG. 9, the pointing body 7 is omitted for the sake of simplification of the drawing. The length Z1 represents the thickness of the pointing body 7. FIG. 10 is a diagram of the state shown in FIG. 9 viewed from the first direction E.

FIG. 11 is a diagram showing a second taken image C2 represented by second imaging data generated by the imaging device 3 in FIG. 9 and FIG. 10. The second imaging data is generated by the imaging device 3 for taking the image of the projection surface 6 in the situation in which the dot A1 is projected on the pointing body 7 touching the projection surface 6.

The second taken image C2 shows a position B1 of the dot A1 with which the pointing body 7 touching the projection surface 6 is irradiated. The position B1 is shifted as much as a distance d1 from the position B0 shown in the first taken image C1 in the predetermined direction corresponding to the first direction E. This shift is caused by the parallax between the imaging lens 31 and the second projection lens 21. The parallax is generated in the first direction E.

The position B1 is shifted as much as the distance d1 from the position B0 in the predetermined direction, but is not shifted from the position B0 in a direction N perpendicular to the first direction E. FIG. 9 shows a shift amount D1 corresponding to the distance d1 on the projection surface 6.

Figure 12:
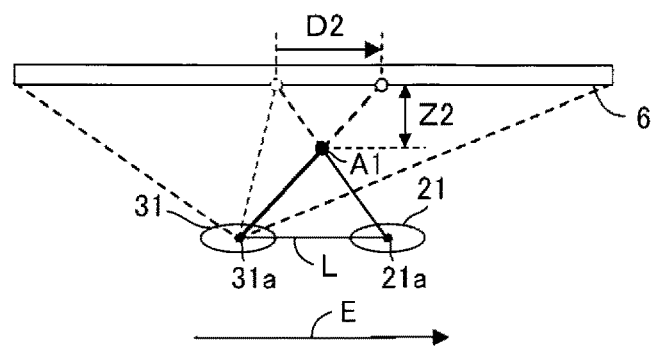
FIG. 12 is a diagram showing a state in which the pointing body not touching the projection surface is irradiated with the dot.
Figure 13:
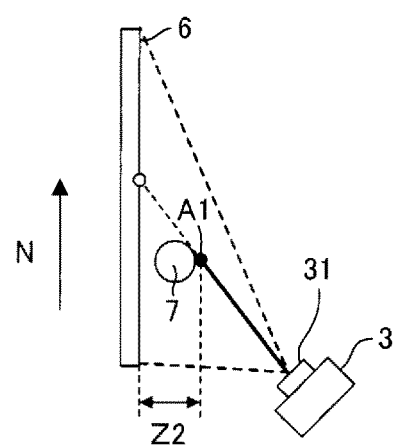
FIG. 13 is a diagram of the configuration shown in FIG. 12 viewed from the direction M.
Figure 14:
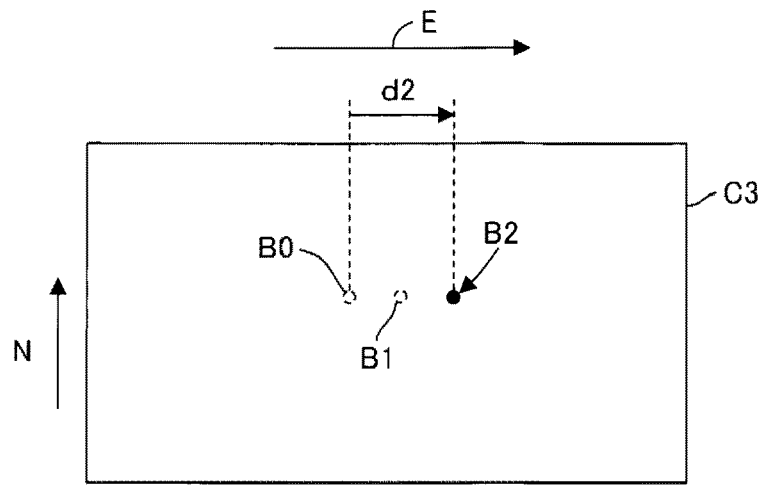
FIG. 14 is a diagram showing a third taken image represented by third imaging data.

FIG. 12 through FIG. 14 are diagrams for explaining the situation in which the pointing body 7 existing between the imaging lens 31 and the projection surface 6 does not touch the projection surface 6.

FIG. 12 is a diagram showing the state in which the dot A1 which is emitted from the second projection lens 21, and with which the pointing body 7 not touching the projection surface 6 is irradiated is imaged by the imaging lens 31 distant as much as the distance L1 in the first direction E from the second projection lens 21. In FIG. 12, the pointing body 7 is omitted for the sake of simplification of the drawing. The length Z2 is obtained by adding the distance from the pointing body 7 to the projection surface 6 to the thickness of the pointing body 7. Therefore, the length Z2 is longer than the length Z1 as the thickness of the pointing body. FIG. 13 is a diagram of the state shown in FIG. 12 viewed from the first direction E.

FIG. 14 is a diagram showing a third taken image C3 represented by third imaging data generated by the imaging device 3 in FIG. 12 and FIG. 13. The third imaging data is generated by the imaging device 3 for taking the image of the projection surface 6 in the situation in which the dot A1 is projected on the pointing body 7 not touching the projection surface 6.

The third taken image C3 shows a position B2 of the dot A1 with which the pointing body 7 not touching the projection surface 6 is irradiated. The position B2 is shifted as much as a distance d2 from the position B0 shown in the first taken image C1 in the predetermined direction corresponding to the first direction E. This shift is caused by the parallax between the imaging lens 31 and the second projection lens 21. The parallax is generated in the first direction E.

The position B2 is shifted as much as the distance d2 from the position B0 in the predetermined direction, but is not shifted from the position B0 in the direction N perpendicular to the first direction E. Since the length Z2 is longer than the length Z1 as the thickness of the pointing body 7, the distance d2 becomes longer than the distance d1. FIG. 12 shows a shift amount D2 corresponding to the distance d2 on the projection surface 6.

Figure 15:
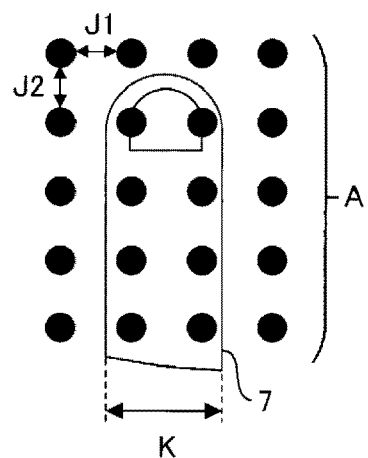
FIG. 15 is a diagram showing a relationship between the pointing body and a plurality of dots.
Figure 16:
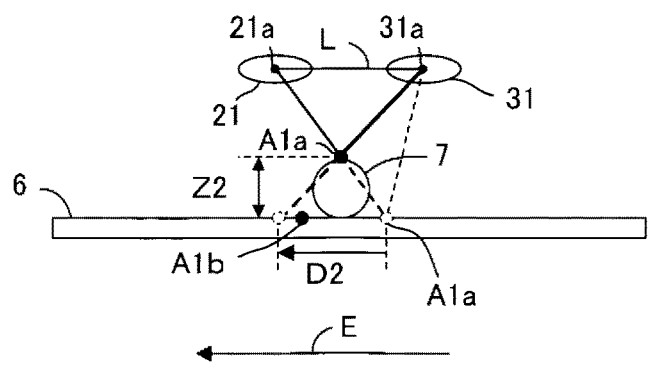
FIG. 16 is a diagram showing a state in which a dot is projected on the pointing body touching the projection surface 6.
Figure 17:
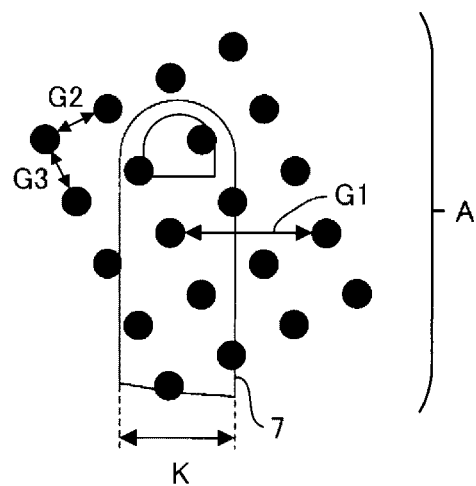
FIG. 17 is a diagram showing a part of the detecting image.

FIG. 15 through FIG. 17 are each a diagram schematically showing a relationship between the pointing body 7 and the plurality of dots A. FIG. 15 and FIG. 17 are each a schematic diagram of superimposing the pointing body 7 with a width K on the pattern of the plurality of dots A. FIG. 17 shows the detecting image S2 corresponding to FIG. 5.

When none of the plurality of dots A is projected on the pointing body 7 touching the projection surface 6, the position detection device 1001 cannot detect the pointing body 7 touching the projection surface 6.

Therefore, it is necessary to shorten each of an interval J1 in the row direction of the plurality of dots A and an interval J2 in the column direction of the plurality of dots A in the detecting image S2.

For example, when 8 mm is assumed as the width K of the pointing body 7, a length shorter than 8 mm, for example, 4 mm is used as the interval J1 and the interval J2. The length of 8 mm corresponds to, for example, a width of a finger of a child. It should be noted that it is sufficient for the interval J1 and the interval J2 to be shorter than a length assumed as the width K of the pointing body 7.

FIG. 16 is a diagram showing the state in which a dot A1a which is projected on the pointing body 7 touching the projection surface 6 is imaged by the imaging lens 31 in the situation in which the dot A1a and a dot A1b are projected from the second projection lens 21. It should be noted that in the situation in which the pointing body 7 does not exist, the dots A1a and A1b are arranged along the predetermined direction corresponding to the first direction E in the order of the dot A1a and the dot A1b on the projection surface 6.

When the dot A1a is projected on the pointing body 7 touching the projection surface 6, the position of the dot A1a in the taken image is shifted along the predetermined direction corresponding to the first direction E compared to when the pointing body 7 does not exist.

When the position of the dot A1a is located in the predetermined direction of the dot A1b adjacent to the dot A1a in the taken image, detection of the touch position becomes complicated. For example, in the pattern of the plurality of dots A in FIG. 15, a shift in cycle that the position of the dot A1a overlaps the position of the dot A1b occurs in some cases in the taken image when the pointing body 7 touches the projection surface 6 and when the pointing body 7 does not touch the projection surface 6, and thus, the detection of the touch position becomes complicated.

In order to avoid the complication in detecting the touch position, it is necessary to elongate the distance between the two dots A1 adjacent to each other in the predetermined direction corresponding to the first direction in the detecting image S2.

In the detecting image S2 shown in FIG. 5 described above, the first distance G1 is longer than both of the second distance G2 and the third distance G3. Therefore, in the detecting image S2, it is possible to elongate the distance between the two dots A1 adjacent to each other in the predetermined direction while shortening each of the interval J1 in the row direction of the plurality of dots A and the interval J2 in the column direction of the plurality of dots A1.

A7. Operation of Detecting Touch Position

Figure 18:
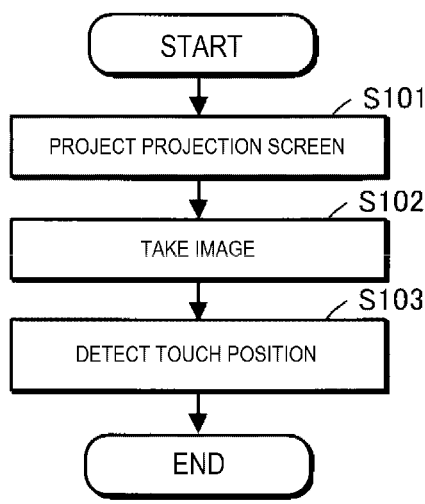
FIG. 18 is a flowchart for explaining an operation of detecting a touch position.

FIG. 18 is a flowchart for explaining an operation of the position detection device 1001 detecting the touch position. The operation shown in FIG. 18 is repeatedly performed. It is assumed that the visual light image S1 is projected at the start of the operation shown in FIG. 18. Further, for the sake of simplification of the explanation, it is assumed that the predetermined direction corresponding to the first direction E is the same direction as the first direction E.

In the step S101, the second projection device 2 projects the detecting image S2 representing the plurality of dots A on the projection surface 6.

For example, in the step S101, first, the second control section 51 retrieves the second image information related to the detecting image S2 from the storage device 4. Then, the second control section 51 generates the second drive signal representing the detecting image S2 based on the second image information. The second control section 51 provides the second projection device 2 with the second drive signal. The second projection section 2 projects the detecting image S2 on the projection surface 6 based on the second drive signal.

Subsequently, in the step S102, the imaging device 3 takes the image of an area including the projection surface 6 via the imaging lens 31 to thereby generate the imaging data in the situation in which the detecting image S2 is projected on the projection surface 6.

For example, in the step S102, first, the second control section 51 outputs an imaging instruction to the imaging section 32. In response to the imaging instruction, the imaging section 32 takes the image of the projection surface 6 via the imaging lens 31 to thereby generate the imaging data.

Subsequently, in the step S103, the position detection section 52 detects the touch position based on the imaging data.

For example, in the step S103, the position detection section 52 detects the touch position based on reference imaging data and the imaging data. The reference imaging data is generated in advance by the imaging section 32. When the imaging section 32 receives the imaging instruction from the user in the situation in which the pointing body 7 does not exist between the projection surface 6 and the imaging lens 31 in the situation in which the detecting image S2 is projected on the projection surface 6, the imaging section 32 takes the image of the projection surface 6 via the imaging lens 31 to thereby generate the reference imaging data.

The position detection section 52 detects the touch position based on a positional relationship of the plurality of dots A represented by the reference imaging data and a positional relationship of the plurality of dots A represented by the imaging data.

As described above, when the dot A1 is projected on the pointing body 7, the position of the dot A1 is shifted along the predetermined direction corresponding to the first direction E in the taken image. The shorter the distance between the projector 1000 and the pointing body 7 is, the larger the shift amount of the position of the dot A1 is.

First, the position detection section 52 identifies the dot A1 the position of which is shifted as a moving dot based on the positional relationship of the plurality of dots A1 represented by the reference imaging data and the positional relationship of the plurality of dots A1 represented by the imaging data.

Then, the position detection section 52 identifies two dots located adjacent to the moving dot in the first direction E, namely the predetermined direction, on the image represented by the reference imaging data as neighboring dots.

Subsequently, when the moving dot is located between the neighboring dots in the image represented by the imaging data, the position detection section 52 determines that a touch to the projection surface 6 by the pointing body 7 has been made.

Then, when the position detection section 52 determines that the touch to the projection surface 6 by the pointing body 7 has been made, the position detection section 52 detects the position of a midpoint between the position of the moving dot after the movement and the position of the moving dot before the movement as the touch position.

Subsequently, the first control section 53 executes the associated processing based on the touch position. For example, the first control section 53 changes the first drive signal based on the touch position to thereby change the visible light image S1.

It should be noted that when the pointing body 7 does not exist between the imaging lens 31 and the projection surface 6, the moving dot does not exist as shown in FIG. 6 through FIG. 8. Therefore, when the moving dot does not exist, the position detection section 52 determines that the touch to the projection surface 6 by the pointing body 7 is not made.

In the present embodiment, when the pointing body 7 not touching the projection surface 6 is irradiated with the moving dot as shown in FIG. 13, the moving dot is not located between the neighboring dots. In this case, the moving dot is located at a place farther in the first direction E, namely the predetermined direction, than both of the neighboring dots. Therefore, when the moving dot is not located between the neighboring dots, the position detection section 52 determines that the touch to the projection surface 6 by the pointing body 7 is not made.

A8. Conclusion of First Embodiment

According to the first embodiment, it is possible to prevent the touch position from being erroneously detected despite the fact that the pointing body 7 does not touch the projection surface 6.

B. Modified Examples

It is possible to make such a variety of modifications as described below on the embodiment described above. Further, it is also possible to properly combine one or more modifications arbitrarily selected from the aspects of the modifications described below.

B1. First Modified Example

In the first embodiment, it is possible for the first projection lens 11, the second projection lens 21, and the imaging lens 31 to be disposed so as to be opposed to the projection surface 6 in the projector 1000.

B2. Second Modified Example

In the first embodiment, the first projection device 1 is located between the second projection device 2 and the imaging device 3. However, the first projection device 1 is not required to be located between the second projection device 2 and the imaging device 3.

B3. Third Modified Example

In the first embodiment, the liquid crystal light valve is used as the light modulation device. However, the light modulation device is not limited to the liquid crystal light valve. For example, it is also possible for the light modulation device to have a configuration using a reflective liquid crystal panel. It is possible for the light modulation device to have a configuration such as a system having a liquid crystal panel and a color wheel combined with each other, a system using a digital mirror device, or a system having a digital mirror device and a color wheel combined with each other. Further, besides the liquid crystal panel or the digital mirror device, any configurations capable of modulating the light emitted by the light source can be adopted as the light modulation device.

C. Aspects Figured Out from Embodiment and Modified Examples

The following aspects can be figured out from at least one of the embodiment and the modified examples described above.

C1. First Aspect

The position detection device 1001 and the projector 1000 include the second projection lens 21, the second projection section 22, the imaging lens 31, the imaging section 32, and the position detection section 52.

The second projection device 22 projects the detecting image S2 representing the plurality of dots A on the projection surface 6 via the second projection lens 21. The plurality of dots A is an example of the plurality of objects. The plurality of objects is not limited to the plurality of dots A. For example, the plurality of objects can be a plurality of polygons, or a plurality of ellipses. The imaging lens 31 is located at a place distant in the first direction E from the second projection lens 21. The imaging section 32 takes the image of the projection surface 6 via the imaging lens 31 to thereby generate the imaging data in the situation in which the pointing body 7 touches the projection surface 6 in the situation in which the detecting image S2 is projected on the projection surface 6. The position detection section 52 detects the position of touch portion 6a touched by the pointing body 7 in the projection surface 6 based on the imaging data.

The detecting image S2 represents the plurality of dots A located in a matrix. The first distance G1 between the two dots A1 adjacent to each other in the predetermined direction corresponding to the first direction E out of the plurality of dots A1 is longer than both of the second distance G2 and the third distance G3. The second distance G2 is a distance between the two dots A1 adjacent to each other in the row direction H of the matrix out of the plurality of dots A. The third distance G3 is a distance between the two dots A1 adjacent to each other in the column direction I of the matrix out of the plurality of dots A. The position detection section 52 detects the position of the touch portion 6a based on the positional relationship in the predetermined direction corresponding to the first direction E of the plurality of dots A represented by the imaging data.

According to this aspect, it is possible to make the first distance G1 between the two dots A1 adjacent to each other in the predetermined direction corresponding to the first direction E longer than the second distance G2 and the third distance G3 while increasing the density of the plurality of dots A. Therefore, it is possible to project the dot A1 on the pointing body 7 touching the projection surface 6, and at the same time, it is possible to make the shift amount of the dot A1 to be projected on the pointing body 7 touching the projection surface 6 smaller than the first distance G1. Therefore, it is possible for the position detection device 1001 and the projector 1000 to easily detect the pointing body 7 touching the projection surface 6. Therefore, it is possible to prevent the touch position from being erroneously detected despite the fact that the pointing body 7 does not touch the projection surface 6.

C2. Second Aspect

In the first aspect, the plurality of dots A is used as the plurality of objects. In other words, each of the objects is a dot. According to this aspect, it is possible to make the shape of the object simple.

C3. Third Aspect

In the first aspect or the second aspect, the detecting image S2 is an image of showing the plurality of dots A with the infrared light. According to this aspect, it is possible to detect the touch position while preventing the plurality of dots A from being visually recognized by the user. It should be noted that when no problem occurs when the plurality of dots A is visually recognized by the user, it is possible for the detecting image S2 to be an image showing the plurality of dots A with the visible light.

C4. Fourth Aspect

In any one of the first aspect through the third aspect, the imaging section 32 takes the image of the projection surface 6 via the imaging lens 31 in the situation in which the pointing body 7 does not exist between the projection surface 6 and the imaging lens 31 in the situation in which the detecting image S2 is projected on the projection surface 6 to thereby generate the reference imaging data. The position detection section 52 detects the touch position based on the positional relationship in the predetermined direction corresponding to the first direction E of the plurality of dots A represented by the reference imaging data and the positional relationship in the predetermined direction corresponding to the first direction E of the plurality of dots represented by the imaging data.

A difference between the reference imaging data and the imaging data is a difference between whether or not the pointing body 7 exists between the projection surface 6 and the imaging lens 31. Therefore, even when the detecting image S2 on the projection surface 6 has a distortion caused by the asperity of the projection surface 6, the distortion of the detecting image S2 caused by the asperity of the projection surface 6 is canceled out in the difference between the reference imaging data and the imaging data. Therefore, the detection accuracy of the touch detection increases compared to a configuration of, for example, detecting the touch position based on the detecting image S2 projected via the second projection lens 21 and the imaging data.

What is claimed is:

1. A position detection method comprising:
    projecting a detecting image on a projection surface from a projection lens;
    taking an image of the projection surface via an imaging lens located at a place distant in a first direction from the projection lens to thereby generate imaging data in a situation in which a pointing body touches the projection surface in a situation in which the detecting image is projected on the projection surface, the first direction extending between a center of the projection lens and a center of the imaging lens; and
    detecting a position of a touch portion touched by the pointing body on the projection surface based on the imaging data, wherein
    the detecting image represents a plurality of objects located in a matrix,
    a first distance between two objects adjacent to each other in a predetermined direction corresponding to the first direction out of the plurality of objects is longer than both of a second distance and a third distance,
    the second distance is a distance between two objects adjacent to each other in a row direction of the matrix out of the plurality of objects,
    the third distance is a distance between two objects adjacent to each other in a column direction of the matrix out of the plurality of objects, and
    the position of the touch portion is detected based on a positional relationship in the predetermined direction of the plurality of objects represented by the imaging data.

2. The position detection method according to claim 1, wherein
    each of the objects is a dot.

3. The position detection method according to claim 1, wherein
    the detecting image is an image showing the plurality of objects with infrared light.

4. The position detection method according to claim 1, further comprising:
taking an image of the projection surface to thereby generate reference imaging data in a situation in which the pointing body does not exist between the projection surface and the imaging lens in the situation in which the detecting image is projected on the projection image, wherein
the position of the touch portion is detected based on a positional relationship in the predetermined direction of the plurality of objects represented by the reference imaging data, and the positional relationship in the predetermined direction of the plurality of objects represented by the imaging data.

5. A position detection device comprising:
a projection lens configured to project a detecting image on a projection surface;
an imaging lens which is located at a place distant in a first direction from the projection lens, having an image sensor which is configured to take an image of the projection surface via the imaging lens to thereby generate imaging data in a situation in which a pointing body touches the projection surface in a situation in which the detecting image is projected on the projection surface, the first direction extending between a center of the projection lens and a center of the imaging lens; and
one or more processors programmed to:
detect a position of a touch portion touched by the pointing body on the projection surface based on the imaging data, wherein
the detecting image represents a plurality of objects located in a matrix,
a first distance between two objects adjacent to each other in a predetermined direction corresponding to the first direction out of the plurality of objects is longer than both of a second distance and a third distance,
the second distance is a distance between two objects adjacent to each other in a row direction of the matrix out of the plurality of objects,
the third distance is a distance between two objects adjacent to each other in a column direction of the matrix out of the plurality of objects, and
the one or more processors detect the position of the touch portion based on a positional relationship in the predetermined direction of the plurality of objects represented by the imaging data.

6. A position detection method comprising:
projecting, from a projection lens, a detecting image including a pattern in which objects are arranged periodically in a second direction and a third direction perpendicular to the second direction;
taking an image of an area including a projection surface on which the detecting image is projected via an imaging lens to thereby generate imaging data; and
detecting a position of a touch portion in a first direction of the projection surface based on a positional relationship in the first direction of the objects in the imaging data, wherein
the first direction extends between a center of the projection lens and a center of the imaging lens,
the imaging lens is disposed at a distance in the first direction from the projection lens,
a first distance between two objects adjacent to each other in the first direction is longer than both of a second distance and a third distance,
the second distance is a distance between two objects adjacent to each other in the second direction, and
the third distance is a distance between two objects adjacent to each other in the third direction.

* * * * *